United States Patent [19]

Joyce

[11] Patent Number: 5,086,132
[45] Date of Patent: Feb. 4, 1992

[54] REDUCTION OF AGGLOMERATION

[75] Inventor: William H. Joyce, New Town, Conn.

[73] Assignee: Union Carbide Chemicals & Plastics Technology Corporation, Danbury, Conn.

[21] Appl. No.: 625,938

[22] Filed: Dec. 10, 1990

[51] Int. Cl.$^5$ .............................................. C08F 2/00
[52] U.S. Cl. ..................................... 526/74; 526/135; 526/136; 526/144; 526/159; 526/169.2
[58] Field of Search ................... 526/74; 524/847, 855, 524/856

[56] References Cited

U.S. PATENT DOCUMENTS 3,520,859 7/1970 Schrage et al. ..................... 526/74

Primary Examiner—Joseph L. Schofer
Assistant Examiner—David Wu
Attorney, Agent, or Firm—Saul R. Bresch

[57] ABSTRACT

A process for the polymerization of a liquid alpha-olefin or a solution of two or more alpha-olefins and, optionally, one or more diolefins
  wherein the sole process medium is one or more of the said olefins in liquid form
  comprising:
  (a) admixing the liquid alpha-olefin or the solution with an inert particulate material having a mean particle size in the range of about 0.01 to about 10 microns in an amount of at least about 0.005 percent by weight of particulate material based on the total weight of the resin and particulate material in the final product; and
  (b) contacting the mixture formed in step (a) with a catalyst system adapted to polymerize the olefin(s) in the mixture at a temperature and pressure sufficient to (i) provide polymerization conditions; (ii) maintain the olefin(s) in the liquid phase throughout the polymerization; and (iii) maintain the polymer product in its sticky phase.

6 Claims, No Drawings

REDUCTION OF AGGLOMERATION

TECHNICAL FIELD

This invention relates to the reduction of polymer particle agglomeration in liquid phase processes, particularly for the production of elastomers.

BACKGROUND INFORMATION

A sticky polymer is one that tends to agglomerate at certain temperatures. It may be inherently sticky due to its chemical or mechanical properties or pass through a sticky phase during the production cycle. Sticky polymers are also referred to as non-free flowing polymers because of their tendency to compact into aggregates of much larger size then the original particles and not flow out of the relatively small openings in the bottom of product discharge tanks or purge bins.

Three major process types are currently being used for the production of these sticky polymers, i.e., (1) The bulk monomer slurry process is quite efficient for contacting monomers with catalyst and obtaining high productivity. Some of the disadvantages associated with this process are the relatively high pressures used; and the very high concentration of dissolved monomer in the resin exiting the reactor. This type of process is characterized by a relatively small volume main reactor coupled to extensive monomer recovery/polymer flash and recovery facilities. (2) The diluent slurry process operates in a manner similar to the bulk monomer slurry process; however, the reactor tends to be larger and of lower pressure capability due to a lower monomer concentration requiring a larger reactor volume for the same rate of polymerization. The same disadvantages of the bulk slurry process are shared by the diluent slurry process. If the polymer is permitted to dissolve in the diluent, the solution viscosity increases drastically leading to reactor fouling. Relatively large diluent/monomer recovery systems must be maintained to economically recover same from purge bins and product recovery systems. (3) The solution process allows operation at higher reaction temperatures with improved heat removal. It also allows high polymerization rates for given reactor size due to the usually positive effect of reaction temperature on the activity of the polymerization catalyst. A major disadvantage of the solution process is the typically cumbersome recovery methods required for polymer and solvent. These methods require a significant amount of equipment and produce the final polymer in pellet form, which can be difficult to purge of residual monomer and solvent to environmentally safe and acceptable levels. One additional factor involved in the use of a solution process is the presence of a large volume of hot solvent, frequently well above the flash point, which contains a significant amount of dissolved polymer Spills of this type of material present significant hazards with regard to fire and personnel exposure. A further disadvantage of the solution process is that the rate and, to some extent, the operability of the system is dependent on the molecular weight and solubility of the particular product being produced. Products of higher density than desired (or designed for) will precipitate in cool spots in the lines and foul the reaction system. Products of higher molecular weight will increase solution viscosity to the point that the design capability of the circulation system will be exceeded and operations will become impractical. A major product deficiency of the solution processes is that they are inherently incapable of production of desirable high molecular weight or ultrahigh molecular weight grades of resin.

The sticky polymers, which are produced with varying degrees of success by the aforementioned processes, are for the most part elastomers such as ethylene/propylene rubbers and ethylene/propylene diene termonomer rubbers, high ethylene content propylene/ethylene block copolymers, poly(1-butene) (when produced under certain reaction conditions), very low density (low modulus) polyethylenes, e.g., ethylene/butene rubbers or hexene containing terpolymers, and ethylene/propylene/ethylidene norbornene terpolymers of low density.

While all of the problems raised by these liquid phase processes cannot be readily overcome, industry is constantly seeking to select, and improve on, the most efficient of the processes, particularly with the reduction of agglomeration in mind.

DISCLOSURE OF THE INVENTION

An object of this invention, therefore, is to select the most efficient of these liquid phase processes, and provide the process with means for eliminating or at least minimizing the problem of agglomeration.

Other objects and advantages will become apparent hereinafter.

According to the present invention, the above object is met by a process for the polymerization of a liquid alpha-olefin or a solution of two or more alpha-olefins and, optionally, one or more diolefins wherein the sole process medium is one or more of the said olefins in liquid form comprising:

(a) admixing the liquid alpha-olefin or the solution with an inert particulate material having a mean particle size in the range of about 0.01 to about 10 microns in an amount of at least about 0.005 percent by weight of particulate material based on the total weight of the resin and particulate material in the final product; and (b) contacting the mixture formed in step (a) with a catalyst system adapted to polymerize the olefin(s) in the mixture at a temperature and pressure sufficient to (i) provide polymerization conditions; (ii) maintain the olefin(s) in the liquid phase throughout the polymerization; and (iii) maintain the polymer product in its sticky phase.

DESCRIPTION OF THE PREFERRED EMBODIMENT

It is important to the process of the invention that the process be carried out in the liquid phase in a medium, which is made up of one or more of the liquid monomers to be polymerized. Where more than one monomer is used, as is generally the case in the preparation of elastomers, the liquid monomers serve as the solvent or liquid pool and the gaseous monomers, if any, as the solute. While the liquid olefins (i.e., liquid at ambient temperatures) are represented by $C_5$ and higher compounds, the lower olefins can be maintained in the liquid phase under pressure. Thus, liquified propylene can, and does, serve as a solvent or liquid pool for ethylene, for example, in processes for the manufacture of ethylene/propylene rubber (EPR) and ethylene/propylene/diene monomer rubber (EPDM). It will be understood that the suitable liquid olefins are miscible with one another and the suitable gaseous olefins are soluble in the liquid pool.

The alpha-olefins, which are useful in subject process, can have 2 to 12 carbon atoms and preferably have 2 to 8 carbon atoms. Useful diolefins can be acyclic or cyclic and can have 4 to 20 carbon atoms. Examples of these olefins are ethylene, propylene, 1-butene, 1-hexene, 4-methyl-1-pentene, 1-octene, butadiene, ethylidene norbornene, 1,4-pentadiene, 1,4-hexadiene, 1,4-octadiene, dicyclopentadiene, 5-methyl-1,4-hexadiene, and cyclopentadiene. The dienes are commonly the third monomer in a terpolymer. In addition to copolymers of two or three monomers, copolymers of four or more monomers are contemplated.

The particulate materials to be mixed with the liquid alpha-olefin or olefin solution are inert to the reactant monomers and the catalyst system employed in the process. Any of the numerous varieties of inert particulate materials can be used in the process, e.g., the various carbon blacks, silicas, clays, metal oxides, compounds containing metal oxides or silica, and other inorganic compounds, and mixtures thereof. It will be noted that many of these particulate materials are also used as catalyst supports. The distinction is that the catalyst supports find their way into the internals of the resin product along with the catalyst while the particulate materials of interest here remain on the surface of the resin.

Carbon blacks, for example, furnace black, channel black, thermal black, acetylene black, and lamp black, are the preferred particulate materials. Useful carbon blacks have a primary particulate size of about 10 to about 100 nanometers and an average size of aggregate (primary structure) of about 0.1 to about 10 microns. The specific surface area of the carbon black is about 30 to about 1500 square meters per gram and displays a dibutylphthalate (DBP) absorption of about 80 to about 350 cubic centimeters per 100 grams of carbon black.

Typical silicas, which can be used, are amorphous silicas having a primary particle size of about 5 to about 50 nanometers and an average size of aggregate of about 0.1 to about 10 microns. The average size of agglomerates of these silicas is about 2 to about 120 microns. The silicas employed can have a specific surface area of about 50 to about 500 square meters per gram and a dibutylphthalate (DBP) absorption of about 100 to about 400 cubic centimeters per 100 grams of silica.

Typical clays, useful in the invention, have an average particle size of about 0.01 to about 10 microns and a specific surface area of about 3 to about 30 square meters per gram. They exhibit oil absorption of about 20 to about 100 grams per 100 grams of clay.

The inert particulate material is preferably treated, prior to entry into the reactor, to remove traces of moisture and oxygen. This can be accomplished by purging the material with nitrogen gas, and heating by conventional procedures. The mean particle size (diameter) of the particulate materials can be in the range of about 0.01 to about 10 microns and is preferably in the range of about 0.1 to about 5 microns. In the case of carbon black and silica, and other particulate materials of a similar nature, the mean particle size is the average size of the aggregate, which forms the particle. The amount of particulate materials used in the mixture can be in the range of about 0.005 to about 80 percent by weight based on the total weight of the mixture of resin and particulate materials in the final product and is preferably in the range of about 5 to about 75 percent by weight.

The second (or polymerization) step is conducted in a conventional manner provided that the temperature and pressure are sufficient to (i) provide polymerization conditions; (ii) maintain the olefin(s) in the liquid phase throughout the polymerization; and (iii) maintain the polymer product in its sticky phase.

It will be understood that, even though the polymer product is in its sticky phase, the inert particulate material prevents excessive agglomeration. Typical temperatures are in the range of about 30° C. to about 55° C. and typical pressures are in the range of about 300 to about 800 psia and preferably about 350 to about 600 psia.

The catalyst system can be any one of a number used in the liquid phase polymerization of olefins such as those described in U.S. Pat. Nos. 4,298,713; 4,311,816; 4,101,445; 4,124,532; 4,414,132; 4,397,761; and 4,607,019. The catalyst can be one that is soluble in the liquid pool or a catalyst system that is introduced into the liquid pool in slurry form using one of the liquid monomers to provide the medium for the slurry.

Advantages of the invention can be found in the reduction in agglomeration; improved reactor operability; and enhanced morphology of the resin.

The patents referred to in the specification are incorporated by reference herein.

The invention is illustrated by the following examples.

EXAMPLES 1 to 7

A typical liquid pool slurry polymerization is used to provide an ethylene/propylene rubber (EPR). Carbon black, having an average particle size of 1.5 microns, is dried under vacuum overnight at 100° C. The carbon black is loaded into a batch polymerization stirred reactor before the catalyst or monomers are added. Liquid propylene is then added to the reactor in an amount of 300 grams (500 cubic centimeters). A catalyst precursor, vanadium trichloride impregnated into silica wherein the vanadium is approximately 2.2 percent by weight based on the combined weight of the VCl3 and the silica, is then added. The weight ratio of liquid propylene to catalyst precursor is 1500:1. A cocatalyst, triethylaluminum, and a promoter, chloroform, in a mole ratio of about 40:1 are added to the reactor at the same time as the catalyst precursor. Ethylene and hydrogen are then fed into the reactor at partial pressures of about 200 psi and about 0.1 to 1 psi, respectively. Ethylene partial pressure depends on the vapor pressure of propylene at the reactor temperature. At a reactor temperature of 50° C., for example, ethylene partial pressure is about 200 Psi. The reactor is maintained under a total pressure of 480 psia. After the addition of the ethylene and hydrogen, the reactor is heated, and polymerization proceeds with the reactants being maintained in the liquid phase and the resin product in the sticky phase.

It is noted that the carbon black is distributed uniformly on the resin particles in examples 5, 6 and 7.

Variables and results are set forth in the following Table.

TABLE

| Example | °C. | wt % of C3 | Carbon black (wt %) | Productivity (g/m mol V) | Comments |
|---|---|---|---|---|---|
| 1 | 40 | 35 | — | 2954 | Resin collects in chunks. Chunks are |

TABLE-continued

| Example | °C | wt % of C₃ | Carbon black (wt %) | Productivity (g/m mol V) | Comments |
|---|---|---|---|---|---|
| | | | | | relatively easy to break into particles of 400 to 500 microns. |
| 2 | 50 | 45 to 50 | — | 2650 | Resin particles fused into particles of about 2 millimeters. Fused particles difficult to break. |
| 3 | 60 | 55+ | — | 1490 | Resin fused in big lump. No particle morphology can be observed. |
| 4 | 60 | 55+ | 1 | 1351 | Same as Example 3. |
| 5 | 40 | 35 | 0.2 | 3200 | Resin easily broken into particles of 400 to 500 microns. |
| 6. | 50 | 45 to 50 | 0.6 | 1804 | Similar to Example 5; less sticky than Examples 1 to 5; particles about 400 microns. |
| 7 | 50 | 45 to 50 | 4 | 1283 | Similar to Example 6; not sticky; particles less than 400 microns. |

Notes to Table:
1. °C. is the internal temperature of the reactor in degrees Centigrade.
2. Wt % of C₃ is the percent (by weight) of propylene based on the EPR product.
3. Carbon black (wt %) is the percent by weight of carbon black based on the total weight of resin and carbon black in the final product.
4. Productivity (g/m mol V) is the grams of EPR produced per millimole of vanadium.
5. Comments record the observations of the operator as to the physical state of the resin with regard to morphology and particle size.

I claim:

1. A process for the polymerization of a liquid alpha-olefin or a solution of two or more alpha-olefins and, optionally, one or more diolefins
   wherein the sole process medium is one or more of the said olefins in liquid form
   comprising:
   (a) admixing the liquid alpha-olefin or the solution with an inert particulate material having a mean particle size in the range of about 0.01 to about 10 microns in an amount of at least about 0.005 percent by weight of particulate material based on the total weight of the resin and particulate material in the final product; and
   (b) contacting the mixture formed in step (a) with a catalyst system adapted to polymerize the olefin(s) in the mixture at a temperature and pressure sufficient to (i) provide polymerization conditions; (ii) maintain the olefin(s) in the liquid phase throughout the polymerization; and (iii) maintain the polymer product in its sticky phase.

2. The process defined in claim 1 wherein the alpha-olefins have 2 to 12 carbon atoms and the diolefins have 4 to 20 carbon atoms.

3. The process defined in claim 1 wherein the amount of particulate material is in the range of about 0.005 to about 80 percent by weight.

4. The process defined in claim 1 wherein the temperature in step (b) is in the range of about 30° C. to about 55° C.

5. The process defined in claim 1 wherein the catalyst system is based on vanadium.

6. The process defined in claim 5 wherein the catalyst system contains a vanadium compound, a hydrocarbyl aluminum cocatalyst, and a halogen containing promoter.

* * * * *